(12) United States Patent
Grosch et al.

(10) Patent No.: US 11,511,494 B2
(45) Date of Patent: Nov. 29, 2022

(54) MANUFACTURING INSTALLATION AND METHOD FOR THE ADDITIVE MANUFACTURING OF COMPONENTS WITH A MATERIAL OVERHANG

(71) Applicant: Ford Global Technologies, LLC, Dearborn, MI (US)

(72) Inventors: Guenter Hans Grosch, Vettweiß (DE); Andreas Kuske, Geulle (DE); Bas van den Heuvel, Limburg (NL); Richard Fritsche, Wermelskirchen (DE); Wilbert Hemink, Landgraaf (NL); Rainer Lach, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 16/815,660

(22) Filed: Mar. 11, 2020

(65) Prior Publication Data

US 2020/0290287 A1 Sep. 17, 2020

(30) Foreign Application Priority Data

Mar. 11, 2019 (DE) .......................... 102019203283.4

(51) Int. Cl.
*B29C 64/40* (2017.01)
*B29C 64/393* (2017.01)
(Continued)

(52) U.S. Cl.
CPC ............ *B29C 64/40* (2017.08); *B29C 64/393* (2017.08); *B33Y 10/00* (2014.12); *B33Y 30/00* (2014.12);
(Continued)

(58) Field of Classification Search
CPC ..... B29C 64/40; B29C 64/379; B29C 64/245; B29C 64/364; B29C 64/393; B33Y 10/00; B33Y 30/00; B33Y 50/02
(Continued)

(56) References Cited

U.S. PATENT DOCUMENTS

| 5,362,427 A | 11/1994 | Mitchell, Jr. |
| 6,682,684 B1 | 1/2004 | Jamalabad et al. |

(Continued)

FOREIGN PATENT DOCUMENTS

WO 2017025956 2/2017

OTHER PUBLICATIONS

Langnau, L., 3 Tips on Optimizing Additive Support Structures, Make Parts Fast, pp. 1-5 of 9, Aug. 21, 2017.
(Continued)

*Primary Examiner* — Seyed Masoud Malekzadeh
*Assistant Examiner* — Lawrence D. Hohenbrink, Jr.
(74) *Attorney, Agent, or Firm* — Burris Law, PLLC

(57) ABSTRACT

A manufacturing installation for the additive manufacturing of components, each provided with at least one material overhang, has at least one building platform on which the particular component can at least partially be additively manufactured. In order to reduce the material consumption and the time to produce additively manufactured components, the manufacturing installation has at least one preferably electrically controllable support device with at least one movable support arm for the at least temporary holding of at least one support element, arranged on the support arm, during the additive manufacture of the particular component above the building platform.

20 Claims, 3 Drawing Sheets

(51) Int. Cl.
    *B33Y 50/02*         (2015.01)
    *B33Y 30/00*         (2015.01)
    *B33Y 10/00*         (2015.01)
    *B29C 64/245*       (2017.01)
    *B29C 64/379*       (2017.01)
    *B29C 64/364*       (2017.01)

(52) U.S. Cl.
    CPC ............ *B33Y 50/02* (2014.12); *B29C 64/245* (2017.08); *B29C 64/364* (2017.08); *B29C 64/379* (2017.08)

(58) Field of Classification Search
    USPC .......................................... 264/308; 425/375
    See application file for complete search history.

(56) References Cited

U.S. PATENT DOCUMENTS

| | | | |
|---|---|---|---|
| 9,555,582 B2 | 1/2017 | Javidan et al. | |
| 2016/0250808 A1 | 9/2016 | Barnwell, III et al. | |
| 2017/0355141 A1 | 12/2017 | Bettermann et al. | |
| 2021/0008807 A1* | 1/2021 | Woodworth | B22F 10/47 |

OTHER PUBLICATIONS

3D Hubs, Get Started with 3D Printing: SOLIDWORKS tips from 3D Hubs, pp. 1-5, Jul. 21, 2015.

* cited by examiner

MANUFACTURING INSTALLATION AND METHOD FOR THE ADDITIVE MANUFACTURING OF COMPONENTS WITH A MATERIAL OVERHANG

CROSS-REFERENCE TO RELATED APPLICATIONS

This application claims priority to and the benefit of German Patent Application No. 102019203283.4 filed on Mar. 11, 2019. The disclosure of the above application is incorporated herein by reference.

FIELD

The present disclosure relates to a manufacturing installation for the additive manufacturing of components with at least one material overhang.

BACKGROUND

The statements in this section merely provide background information related to the present disclosure and may not constitute prior art.

The expression "additive manufacture" includes various technologies for producing components with highly complex geometries, for example from a plastic or a metal. The additive manufacture of a component is distinguished by building up the component in layers.

If the component to be manufactured is intended to have a laterally overhanging portion (material overhang) which is arranged above and at a distance from a building platform on which a base of the component is directly formed, a support structure, that is to say an additional material, conventionally has to be arranged on the building platform, onto which support structure the layers of the material overhang are additively deposited.

In this respect, the support structure may be produced from the same material as the component to be produced or from a different material, in particular likewise by means of additive manufacture. However, after the production of the component with a material overhang, the support structure or the material of the support structure has to be removed from the finished component. Conventionally, this is necessary in the case of almost all components with a complex geometry.

Forming and removing the particular support structure extends the time for the production of components and causes additional material consumption, which may be considerable depending on the particular component size, the particular production orientation and the particular component geometry. Since the length of the production time is relevant and the material of manufacture is very cost-intensive, measures should be taken to reduce the production time and the material consumption in order to decrease production costs.

U.S. Pat. No. 9,555,582 B2 discloses an additive production method for the additive manufacturing of a wall structure on a print bed, wherein a support piece with a non-stick surface is positioned near to or inside of the wall structure, and wherein a layer of material is additively manufactured on one or more walls and on the support piece to create a material overhang. The support piece is removed after the material of which the material overhang consists has returned to a solid state or has hardened.

US 2017/0355141 A1 discloses a device for forming volume bodies by additive material deposition. The device has a carrier on which the volume body is formed, a deposition unit for building up the volume body on the carrier by additive deposition of material, and a tool carrier with a tool holder in which the deposition unit is accommodated, wherein the tool carrier is designed in such a way that the deposition unit accommodated in the tool holder can be aligned in five directions by moving the tool holder with respect to the carrier.

U.S. Pat. No. 6,682,684 B1 discloses a method for improving layered production techniques to improve the surface properties of objects and to shorten the production time of support structures. Alternating surface improvement materials are deposited on each layer, followed by the deposition of the main material, the edges of which correspond to the previously deposited and solidified surface improvement material. Removable support structures are provided in order to support the deposition of main material. The support structures provide support for depositing the material to form cavity covers.

US 2016/0250808 A1 discloses a method for printing a three-dimensional object using a 3D printer, which deposits a stack of layers made from a printing material. Each layer is bonded to at least part of another layer in the stack forming the object. A support layer made from material is provided, wherein at least part of the support layer is covered with a non-sticking material to reduce bonding of the printing material to the non-sticking material and to the support layer and a layer of the printing material is set down on the support layer, including that part of the support layer which is covered with the non-sticking material.

WO 2017/025956 A1 discloses a system with a 3D printer, a processor for calculating object data for printing the object and a controller for controlling the dispensing in layers of a building material on the basis of the object data. The 3D printer has a dispensing unit for the selective dispensing in layers of building material for constructing the object and a building tray for carrying the dispensed material for constructing the object. A prefabricated support structure is used, wherein the printing of at least a portion of the object takes place via the prefabricated support structure.

U.S. Pat. No. 5,362,427 A discloses a device for carrying at least part of an article during the formation of the article. A source of self-adhesive particles is directed by a particle jetting device or the like to a predetermined position in a controlled environment in order to form the article. A support structure is carried in the controlled environment in order to substantially rigidly carry at least part of the article during the formation of the article by building up the self-adhesive particles. The support structure is a liquid which becomes a solid body in reaction to an electrical charge and becomes the liquid again in reaction to removal of the electrical charge.

The publication retrievable via the link http://blogs.solidworks.com/tech/2015/07/get-started-3d-printing-solidworks-tips-3d-hubs-2.html and the publication retrievable via the link https://www.makepartsfast.com/3-tips-on-optimizing-additive-support-structures/both disclose the use of a support structure for producing components with material overhangs.

SUMMARY

This section provides a general summary of the disclosure and is not a comprehensive disclosure of its full scope or all of its features. It is to be pointed out that the features and measures specified individually in the following description can be combined with one another in any desired technically meaningful way and disclose further forms of the present disclosure. The description, in particular in conjunction with the figures, characterizes and specifies the present disclosure further.

In one form of the present disclosure, a manufacturing installation which has at least one support device with at least one movable support arm for the at least temporary holding of at least one support element, arranged on the support arm, during the additive manufacture of the particular component above the building platform is provided. The spatial position of the support device can be controlled, for example electrically. It can also be stated that the support device is an electrically controllable support device.

The support device according to the present disclosure, which may for example be formed as an industrial robot, makes it possible during the additive manufacture of a component to support, on the building-platform side, one or more layers of a lateral material overhang of the component to be produced, wherein the layers are produced one after another and on top of one another using a liquid material of manufacture. The support device can perform this support at least until the material of manufacture has sufficiently solidified and/or is sufficiently hardened and/or has a sufficient thickness, in order that said material is no longer plastically deformed under its own weight after removal of the support. The support device can then remove the support element from the at least partially finished component and move it either into a rest position or into a further or a different functional position, in order to be able to correspondingly support a further material overhang of the component. That is to say, according to the present disclosure, no support structure is used which, or the material of which, has to be removed from the component and disposed of later. This reduces the material consumption and the time to produce additively manufactured components.

The support element may be positioned in any desired number of different positions, including rotational positions, relative to the component by means of the support device according to the present disclosure, so that the support element can be used to produce components with a very wide variety of structures. It is therefore not necessary to produce and use a dedicated support element for every component geometry, which likewise lowers production costs. In addition, said versatile positionability of the support element relative to the component also makes it possible to realize very complex component forms with material overhangs. Further, the support element can be produced with a considerably lower outlay in terms of material in comparison with a conventional support structure, which further improves the usability of the support element.

The support device may be controlled by installation electronics of the manufacturing installation, without requiring the intervention of operating personnel, for example in dependence on structural data relating to the component to be produced in the specific case. Here, the support device may have one or more actuating drives, by which the support arm can be moved as desired. The support arm may be of single-member, two-member or multiple-member form, wherein members of the support arm may be connected to one another in an articulated manner. The support arm may have, on its free end portion, at least one holding unit for holding the support element, wherein the support element is connected, preferably exchangeably, to the support arm via the holding unit.

The manufacturing installation according to the present disclosure has at least one deposition unit for the deposition in layers of a material of manufacture onto the building platform and the support element. The building platform may have a working surface of planar or other form, on which the particular component can at least partially be additively manufactured. The building platform may be arranged in a positionally fixed or height-adjustable manner.

In some variations of the present disclosure, a surface of the support element is provided, at least in part, with an anti-adhesion coating. This inhibits the support element from adhering to the component, which would make removing the support element from the component more difficult and would additionally be associated with the risk of damage to the component when removing the support element.

In at least one variation of the present disclosure, the support device has at least one cooling unit for cooling the support element. This inhibits the support element from heating up, which would be associated with the risk of a material-bonded connection forming between support element and component. In addition, the component or the material overhang of the component, which material overhang is formed on the support element, is cooled down more quickly by the contact with the cooled support element, whereby the material overhang solidifies more quickly in the desired form. The cooling unit may be of passive form, for example in the form of a heat sink connected physically to the support element, or active form, wherein the support element is subjected to a cooling medium. The cooling unit may be configured to cool the support element exclusively before contact with the material of manufacture. As an alternative, the cooling unit may cool the support element additionally or exclusively when it is in contact with the component.

In some variations of the present disclosure, the support element has a planar, angled or domed plate and/or a surface structuring. As a result, the support element can be optimally adapted to the particular shaping of the material overhang to be produced in this way.

According to some variations, the manufacturing installation has at least one magazine equipped with differently formed support elements, wherein the support device is configured to, in an automated manner, remove a specific support element from the magazine and reinsert a support element removed from the magazine into the magazine. As a result, support elements of various designs can be connected to the support arm, in order to be able to easily adapt the manufacturing installation to the particular usage situation. In addition, the support element can be exchanged in an automated manner, that is to say without intervention by operating personnel.

In at least one variation, the manufacturing installation has at least one deposition unit for the deposition in layers of a metallic material of manufacture onto the building platform and the support element. The material of manufacture may be or comprise a pure metal or a metal alloy or plastic.

In another form of the present disclosure, a method where at least one support element is held at least temporarily over a building platform by at least one preferably electrically controllable support device to form the particular material overhang during the additive manufacture of the particular component, onto which building platform a material of manufacture forming the material overhang is deposited, at least in regions is provided.

The advantages stated above with respect to the manufacturing installation are correspondingly linked to the method. In particular, the manufacturing installation according to one or more of the above-mentioned variations or a combination of at least two of said variations with one another may be used to carry out the method.

For example, in some variations, the support element is cooled before and/or during the additive manufacture of the component. The advantages stated above in relation to the corresponding variations of the manufacturing installation are correspondingly linked to these variations.

In at least one variation of the present disclosure, the particular component is produced by the deposition in layers of a metallic material of manufacture or of a plastic material of manufacture onto the building platform and the support element. The advantages stated above in relation to the corresponding variations of the manufacturing installation are correspondingly linked to this at least one variation.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the different figures, the same parts are always provided with the same reference signs and therefore generally are also only described once.

DETAILED DESCRIPTION

Figure 1:
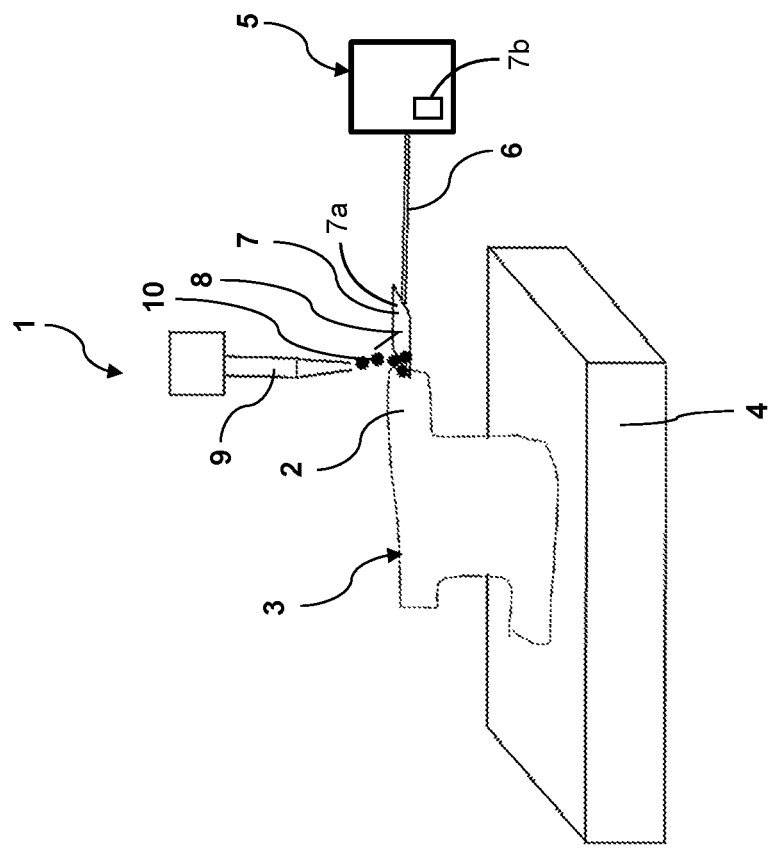
FIG. 1 shows a schematic illustration of a manufacturing installation in a functional state according to the teachings of the present disclosure.

The following description is merely exemplary in nature and is not intended to limit the present disclosure, application, or uses. It should be understood that throughout the drawings, corresponding reference numerals indicate like or corresponding parts and features.

FIG. 1 shows a schematic illustration of one form for a manufacturing installation 1 according to the present disclosure for the additive manufacturing of components 3, each provided with at least one material overhang 2, in a functional state.

The manufacturing installation 1 has a building platform 4, on which the particular component 3 can at least partially be additively manufactured. The building platform 4 is formed as a planar manufacturing table.

Figure 2:
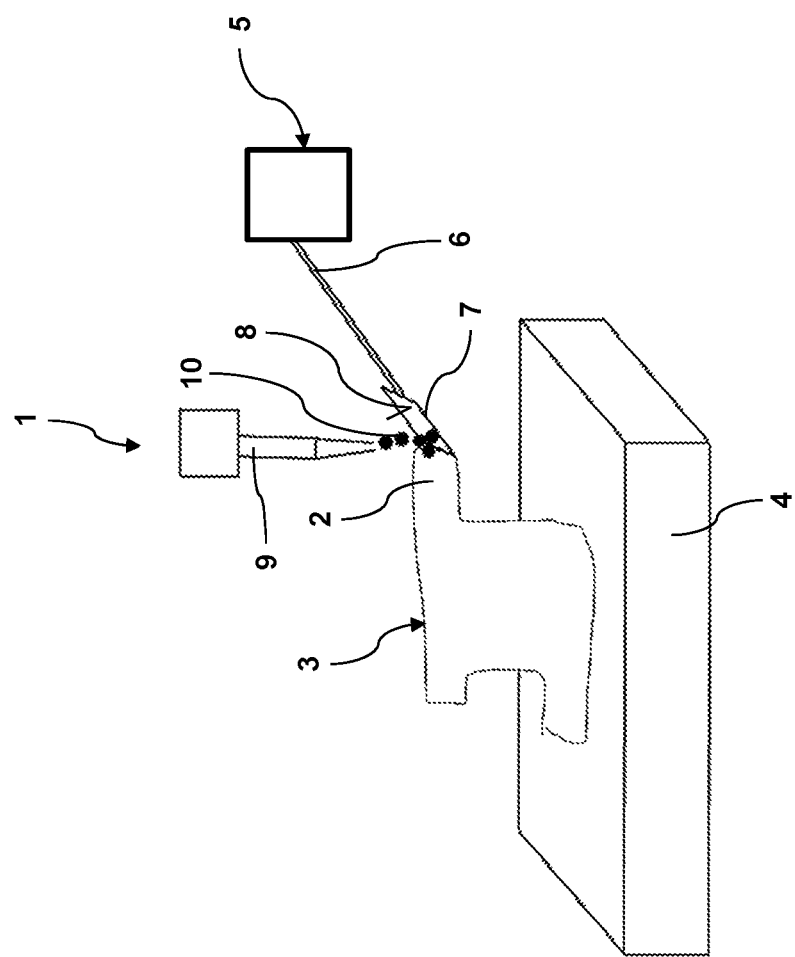
FIG. 2 shows a schematic illustration of the manufacturing installation shown in FIG. 1 in another functional state.

In addition, the manufacturing installation 1 has a support device 5, the spatial position of which can be controlled, for example electrically. The support device 5 can be referred to as an electrically controllable support device 5 and has a movable support arm 6 for the at least temporary holding of at least one support element 7, arranged on the support arm 6, during the additive manufacture of the particular component 3 above the building platform 4, as shown in FIGS. 1 and 2. By way of example, the support element 7 is formed as a planar rectangular plate and has a surface 8 which may be provided, at least in part, with an anti-adhesion coating 7a. The support device 5 may have at least one cooling unit 7b for cooling the support element 7.

Furthermore, the manufacturing installation 1 has a deposition unit 9 for the deposition in layers of a metallic material of manufacture 10 or of a plastic material of manufacture onto the building platform 4 and the support element 7. In the functional position of the manufacturing installation 1 as shown in FIG. 1, the support element 7 is held by the support device 5 in a horizontal position at the component 3.

Further, the manufacturing installation 1 may have at least one magazine 15 equipped with differently formed support elements 7, 11, 12, 13, 14 (FIG. 3), wherein the support device 5 may be configured to, in an automated manner, remove a specific support element 7, 11, 12, 13, 14 from the magazine and reinsert a support element removed from the magazine into the magazine.

FIG. 2 shows a schematic illustration of the manufacturing installation 1 shown in FIG. 1 in a further functional state. This functional state differs from the functional state shown in FIG. 1 in that the support element 7 is arranged not horizontally, but rather in an inclined manner. To avoid repetitions, reference is otherwise made to the above description relating to FIG. 1.

Figure 3:
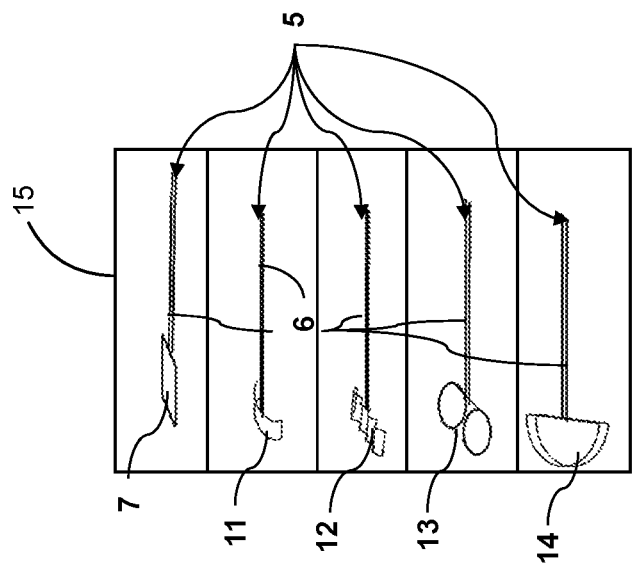
FIG. 3 shows five (5) support elements, of various forms, for a manufacturing installation according to the teachings of the present disclosure.

FIG. 3 shows support elements, of various forms, of a further exemplary form for a manufacturing installation according to the present disclosure (not shown), of which only the support arm 6 of the support device 5 and the particular support elements 7, 11, 12, 13 or 14 are shown in FIG. 3. The support elements 7, 11, 12, 13 and/or 14 may be inserted into or removed from a magazine (not shown) of the manufacturing installation by means of the support device 5.

The support element 7 corresponds to the form shown in FIGS. 1 and 2, which is why, to avoid repetitions, reference is made to the above description relating to FIGS. 1 and 2. The support element 11 is formed as a convexly domed plate. The support element 12 is of wavy form. The support element 13 is formed as a cylinder with an elliptical base area. The support element 14 is of semicircular form.

LIST OF REFERENCE SIGNS

1 Manufacturing installation
2 Material overhang
3 Component
4 Building platform
5 Support device
6 Support arm
7 Support element
8 Surface of 7
9 Deposition unit
10 Material of manufacture
11 Support element
12 Support element
13 Support element Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A manufacturing installation for additive manufacturing of components with at least one material overhang, the manufacturing installation comprising:
    at least one building platform on which a component can at least partially be additively manufactured; and
    at least one support device with at least one movable support arm for temporary holding of at least one support element arranged on the support arm during the additive manufacturing of a particular component above the building platform.

2. The manufacturing installation according to claim 1, wherein a surface of the at least one support element has an anti-adhesion coating.

3. The manufacturing installation according to claim 1, wherein the at least one support device has at least one cooling unit configured to cool the at least one support element.

4. The manufacturing installation according to claim 1, wherein a surface of the at least one support element has an anti-adhesion coating and the at least one support device has at least one cooling unit configured to cool the at least one support element.

5. The manufacturing installation according to claim 1, wherein the at least one support element has at least one of a planar surface, an angled surface and a domed plate surface.

6. The manufacturing installation according to claim 1, wherein the at least one support element is a plurality of support elements with one support element having a planar surface, another support element having an angled surface, and still another support element having a domed plate surface.

7. The manufacturing installation according to claim 6 further comprising at least one magazine equipped with the plurality of support elements, wherein the at least one support device is configured to remove each of the plurality of support elements from the magazine and reinsert each of the plurality of support elements removed from the magazine into the magazine.

8. The manufacturing installation according to claim 1 further comprising at least one deposition unit configured to deposit layers of a metallic material of manufacture or deposit layers of a plastic material of manufacture onto the at least one building platform and the at least one support element.

9. The manufacturing installation according to claim 8, wherein the at least one support device is configured to move the at least one support element after the at least one deposition unit additive manufactures the at least one material overhang on to the at least one support element.

10. A manufacturing installation for additive manufacturing of components with at least one material overhang, the manufacturing installation comprising:
    a building platform on which a component is additively manufactured; and
    a support device with a movable support arm and a support element arranged on the movable support arm, wherein the support device is configured to temporarily hold the support element under the at least one material overhang during the additive manufacturing of the component above the building platform.

11. The manufacturing installation according to claim 10 further comprising an anti-adhesion coating on a surface of the support element.

12. The manufacturing installation according to claim 10 further comprising a cooling unit configured to cool the support element.

13. The manufacturing installation according to claim 10 further comprising an anti-adhesion coating on a surface of the support element and a cooling unit configured to cool the support element.

14. The manufacturing installation according to claim 10, wherein the support element has at least one of a planar surface, an angled surface and a domed plate surface.

15. The manufacturing installation according to claim 10 further comprising a magazine, wherein the support element is a plurality of support elements and the support device is configured to remove one of the plurality of support elements from the magazine and reinsert the one of the plurality of support elements into the magazine.

16. The manufacturing installation according to claim 15, wherein one of the plurality of support elements has a planar surface, another of the plurality of support elements has an angled surface, and still another of the plurality of support elements has a domed plate surface.

17. A method for additive manufacturing a component, the method comprising:
    temporarily holding at least one support element over a building platform during additive manufacturing of at one least material overhang of the component onto the at least one support element, wherein the at least one support element is held by a support device comprising a movable support arm; and
    removing the at least one support element from underneath the at least one material overhang after the at least one material overhang has been additively manufactured over the building platform.

18. The method according to claim 17, wherein the at least one support element is cooled before and/or during the additive manufacture of the at least one material overhang.

19. The method according to claim 17, wherein the component is produced by deposition in layers of a metallic material of manufacture or deposition in layers of a plastic material of manufacture onto the building platform and the support element.

20. The method according to claim 17 further comprising removing the at least one support element from a magazine, positioning the at least one support element over the building platform during additive manufacture of the at least material overhang onto the at least one support element, and reinserting the at least one support element into the magazine after additive manufacture of the at least material overhang.

* * * * *